United States Patent
Cha et al.

(10) Patent No.: US 9,836,275 B2
(45) Date of Patent: Dec. 5, 2017

(54) USER DEVICE HAVING A VOICE RECOGNITION FUNCTION AND AN OPERATION METHOD THEREOF

(71) Applicant: Samsung Electronics Co., Ltd., Suwon-si, Gyeonggi-do (KR)

(72) Inventors: Soon-Hyun Cha, Seoul (KR); Yang-Su Kim, Yongin-si (KR); Jae-Wan Cho, Suwon-si (KR); Sun-Min Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/253,285

(22) Filed: Apr. 15, 2014

(65) Prior Publication Data

US 2014/0316777 A1 Oct. 23, 2014

(30) Foreign Application Priority Data

Apr. 22, 2013 (KR) .................. 10-2013-0043983

(51) Int. Cl.
*G06F 3/16* (2006.01)
(52) U.S. Cl.
CPC .................. *G06F 3/167* (2013.01)
(58) Field of Classification Search
CPC ....................................... G06F 3/167
See application file for complete search history.

(56) References Cited

U.S. PATENT DOCUMENTS

| | | | | |
|---|---|---|---|---|
| 5,500,514 A | * | 3/1996 | Veeneman | G06Q 20/342 235/381 |
| 2002/0091529 A1 | * | 7/2002 | Whitham | H04M 3/4938 704/275 |
| 2007/0192109 A1 | * | 8/2007 | Likens | G10L 15/26 704/275 |
| 2010/0138680 A1 | * | 6/2010 | Brisebois | G06F 1/1626 713/324 |
| 2010/0332226 A1 | * | 12/2010 | Lee | G06F 17/30265 704/235 |
| 2011/0074693 A1 | * | 3/2011 | Ranford | G01C 21/3608 345/173 |
| 2013/0124207 A1 | * | 5/2013 | Sarin | G10L 15/22 704/275 |
| 2013/0325479 A1 | * | 12/2013 | Krueger | G10L 21/00 704/275 |
| 2014/0062896 A1 | * | 3/2014 | Vieta | 345/173 |

FOREIGN PATENT DOCUMENTS

KR 10-2010-0120958 A 11/2010
KR 10-2011-0031797 A 3/2011

* cited by examiner

*Primary Examiner* — Marivelisse Santiago Cordero
*Assistant Examiner* — Lennin Rodriguezgonzalez
(74) *Attorney, Agent, or Firm* — Jefferson IP Law, LLP

(57) ABSTRACT

A user device having a voice recognition function and an operation method thereof are provided. The operation method includes detecting whether there is an input from at least one sensor in response to execution of an application which may use voice recognition and activating or inactivating the voice recognition in response to the detection of the input.

14 Claims, 19 Drawing Sheets

USER DEVICE HAVING A VOICE RECOGNITION FUNCTION AND AN OPERATION METHOD THEREOF

CROSS-REFERENCE TO RELATED APPLICATION(S)

This application claims the benefit under 35 U.S.C. §119(a) of a Korean patent application filed on Apr. 22, 2013 in the Korean Intellectual Property Office and assigned Serial No. 10-2013-0043983, the entire disclosure of which is hereby incorporated by reference.

TECHNICAL FIELD

The present disclosure relates to a user device having a voice recognition function and an operation method thereof.

BACKGROUND

Recently, user devices such as cellular phones, electronic schedulers, personal complex terminals, and laptop computers developed by the electronic communication industry have become necessities in current society. The user devices have developed into important means of information transmission, which quickly change. Each of these user devices facilitates a user's work through a Graphic User Interface (GUI) environment using a touch screen and provides various multimedia via a web environment.

Each of the user devices supports a voice recognition function. Herein, a voice recognition function means a function for receiving a voice command from the user or verbally inputting information from the user. The user selects activation or inactivation of the voice recognition function through a menu on the user device.

The above information is presented as background information only to assist with an understanding of the present disclosure. No determination has been made, and no assertion is made, as to whether any of the above might be applicable as prior art with regard to the present disclosure

SUMMARY

Aspects of the present disclosure are to address at least the above-mentioned problems and/or disadvantages and to provide at least the advantages described below. Accordingly, an aspect of the present disclosure is to provide an apparatus and method for removing an operation of a user, corresponding to activation of voice recognition.

Another aspect of the present disclosure is to provide an apparatus and method for identifying conditions in which voice recognition must be activated and conditions in which voice recognition must not be activated while executing an application which may use voice recognition.

Another aspect of the present disclosure is to provide an apparatus and method for automatically activating or inactivating voice recognition according to whether there is input from at least one sensor (e.g., a grip sensor).

Another aspect of the present disclosure is to provide an apparatus and method for automatically activating or inactivating voice recognition according to whether there is information from at least one sensor (e.g., an inertial sensor).

In accordance with an aspect of the present disclosure, a voice recognition execution method is provided. The voice recognition execution method includes detecting whether there is an input from at least one sensor in response to execution of an application uses voice recognition and activating or inactivating voice recognition in response to the detection of the input.

In accordance with another aspect of the present disclosure, a voice recognition execution method is provided. The voice recognition execution method includes acquiring information from at least one sensor in response to execution of an application that uses voice recognition and activating or inactivating voice recognition in response to the information.

In accordance with another aspect of the present disclosure, an electronic device is provided. The electronic device includes a detection module configured to detect whether there is an input from at least one sensor in response to execution of an application that uses voice recognition and a control module configured to activate or inactivate voice recognition in response to the detection of the input.

In accordance with another aspect of the present disclosure, an electronic device is provided. The electronic device includes an acquisition module for acquiring information from at least one sensor in response to execution of an application that uses voice recognition and a control module configured to activate or inactivate voice recognition in response to the information.

In accordance with another aspect of the present disclosure, an electronic device is provided. The electronic device includes at least one sensor, one or more processors, a memory, and at least one or more programs, each of the one or more programs which is stored in the memory and is configured to be executable by any of the one or more processors, wherein each of the one or more programs detects whether there is an input from at least one sensor in response to execution of an application that uses voice recognition and activates or inactivates voice recognition in response to whether there is the input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 1:
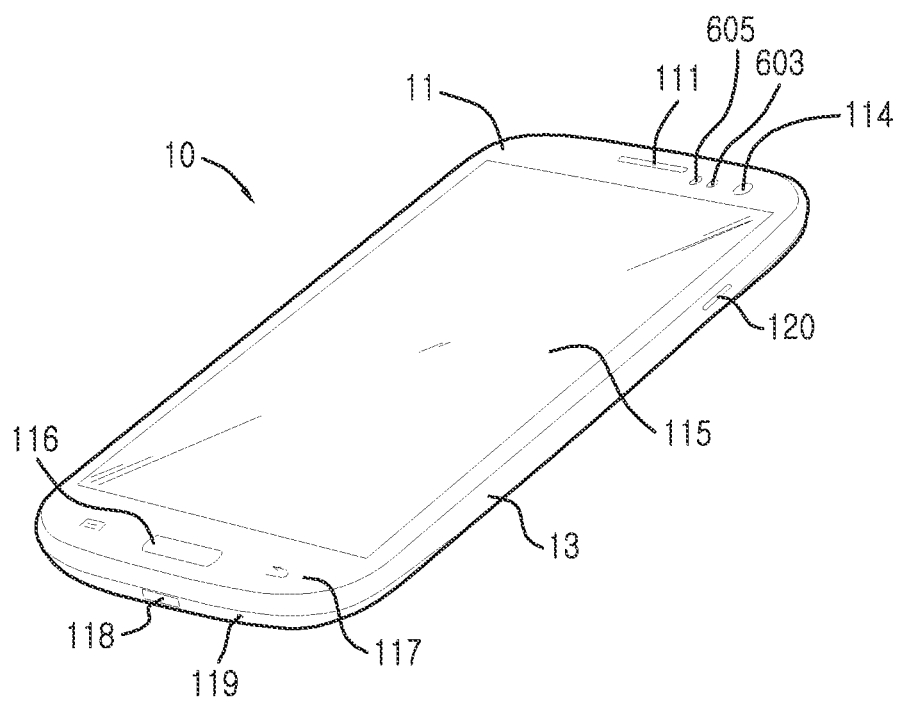
FIGS. 1 and 2 illustrate a perspective view of a user device according to an embodiment of the present disclosure.
Figure 2:
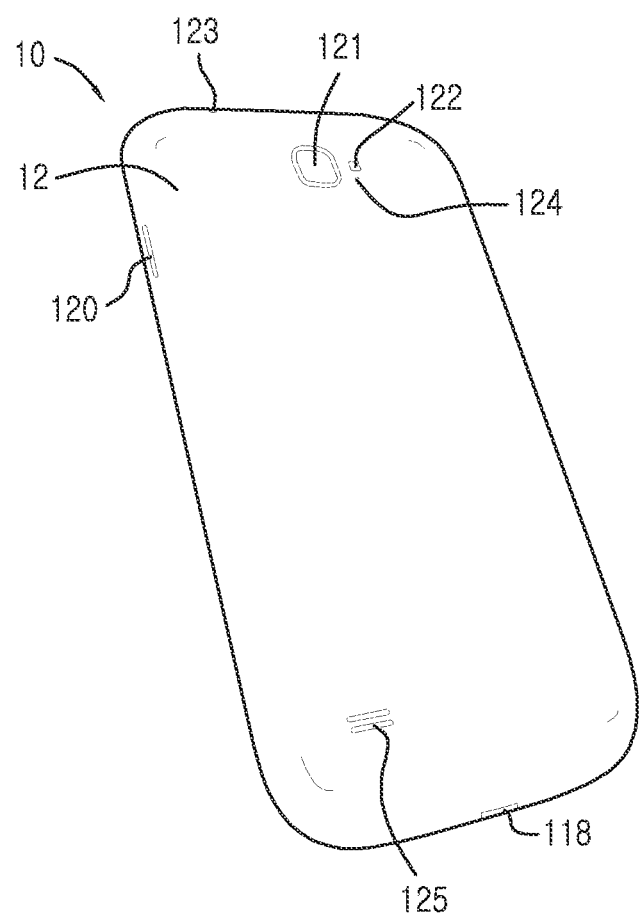

FIGS. 1 and 2 illustrate a perspective view of a user device according to an embodiment of the present disclosure.

Referring to FIG. 1, a speaker 111 for call reception, a photo sensor 605 (e.g., an illumination sensor), a proximity sensor 603, and a front camera 114 may be mounted above a front surface 11 of a user device 10. A touch screen 115 may be mounted on the center of the front surface 11 of the user device 10. A push button 116 and a touch button 117 may be mounted under the front surface 11 of the user device 10. An external connector port 118 and a first microphone 119 may be mounted on a lower end of the user device 10. A slip button 120 may be mounted on a right side of a housing 13 of the user device 10. A volume adjustment button (not shown) may be mounted on a left side of the user device 10.

Referring to FIG. 2, a rear camera 121, a flash 122, and a third microphone 124 may be mounted above a rear surface 12 of the user device 10. A speaker 125 for multimedia may be mounted under the rear surface 12 of the user device 10. A second microphone 123 may be mounted on an upper end of the user device 10.

The user device 10 includes a Printed Circuit Board (PCB) (not shown) which electrically communicates with the above-described elements. A plurality of elements of the above-described elements may be loaded on the PCB and be electrically connected to the PCB through at least one of electric connection means such as a Flexible PCB (FPCB), a cable, etc. This PCB is a board which loads a basic circuit and a plurality of electronic components. The PCB may set an execution environment of the user device 10, hold the set information, and drive the user device 10 stably. The PCB may allow all of the devices of the user device 10 to perform data input and output and data exchange smoothly.

The user device 10 includes a housing 13. The housing 13 may play a role in receiving and fixing the above-described elements as well as forming the appearance of the user device 10. The touch screen 115, the cameras 114 and 121, the flash 122, the external connector terminal 118, etc. may be exposed through an opening formed in the housing 13. The housing 13 has holes for receiving and emitting sounds in a portion where the speakers 111 and 125 and the microphones 119, 123, and 124 are overlapped.

Figure 3:
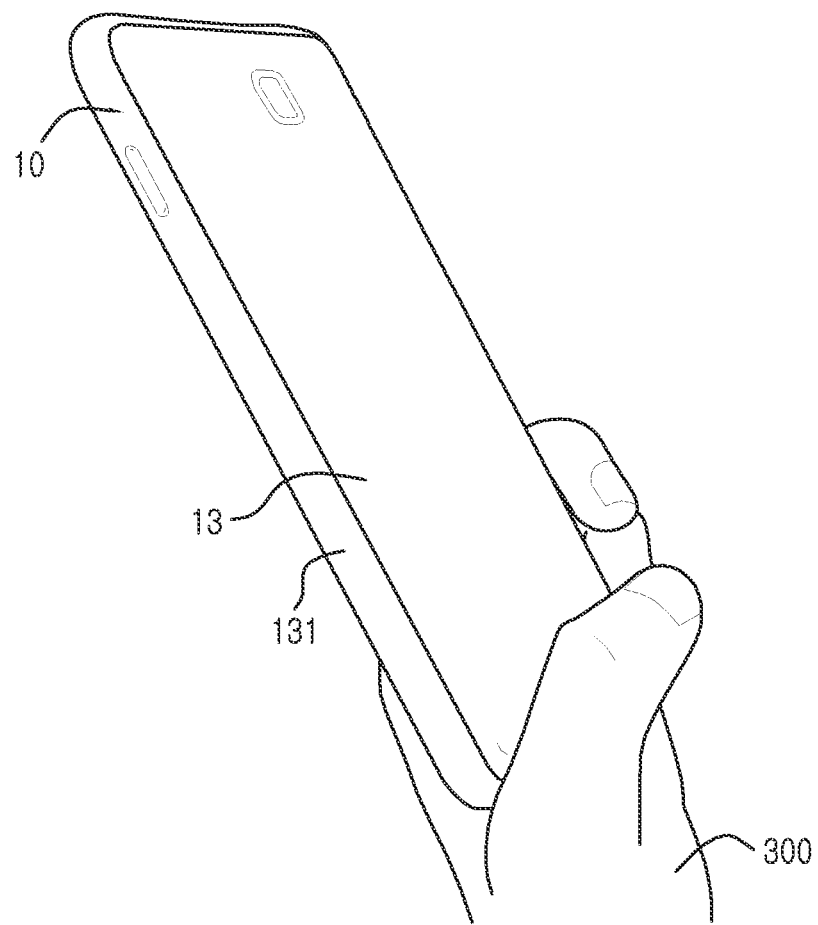
FIG. 3 illustrates a user device according to an embodiment of the present disclosure.

FIG. 3 illustrates a user device according to an embodiment of the present disclosure.

Referring to FIGS. 1 and 3, the user device 10 may include a grip sensor. The grip sensor may be a capacitance sensor which may sense a capacitance change according to a change of an electric field. The grip sensor may include a grip sensor Integrated Circuit (IC) and a metal body electrically connected with the grip sensor IC. The grip sensor IC may sense micro-current which flows in a body of a user through the metal body. A change of capacitance may be generated in the metal body by micro-current. The grip sensor IC may sense the generated change. The metal body is disposed along at least a portion (e.g., a metal edge 131) of an external side surface of the housing 13. When the user grips the user device 10, his or her hand may come in contact with the metal body. The metal body is disposed in an inner side surface of the PCB or the housing 13. When the user does not grip the user device 10, the hand 300 of the user may not come in contact with the metal body and his or her hand 300 and the metal body may be close to each other. This metal body may be at least one of conductive paints for coating, a metal plate for attachment, etc. As shown in FIG. 3, when the user grips the user device 10, input (e.g., a capacitance change) from the grip sensor is generated. The user device 10 may inactivate voice recognition while executing an application which may use voice recognition. Herein, voice recognition means a function for providing a voice command from the user or verbally inputting information from the user. On the other hand, when the user does not grip the user device 10, there is no input from the grip sensor. The user device may activate voice recognition while executing the application which may use voice recognition.

Figure 4:
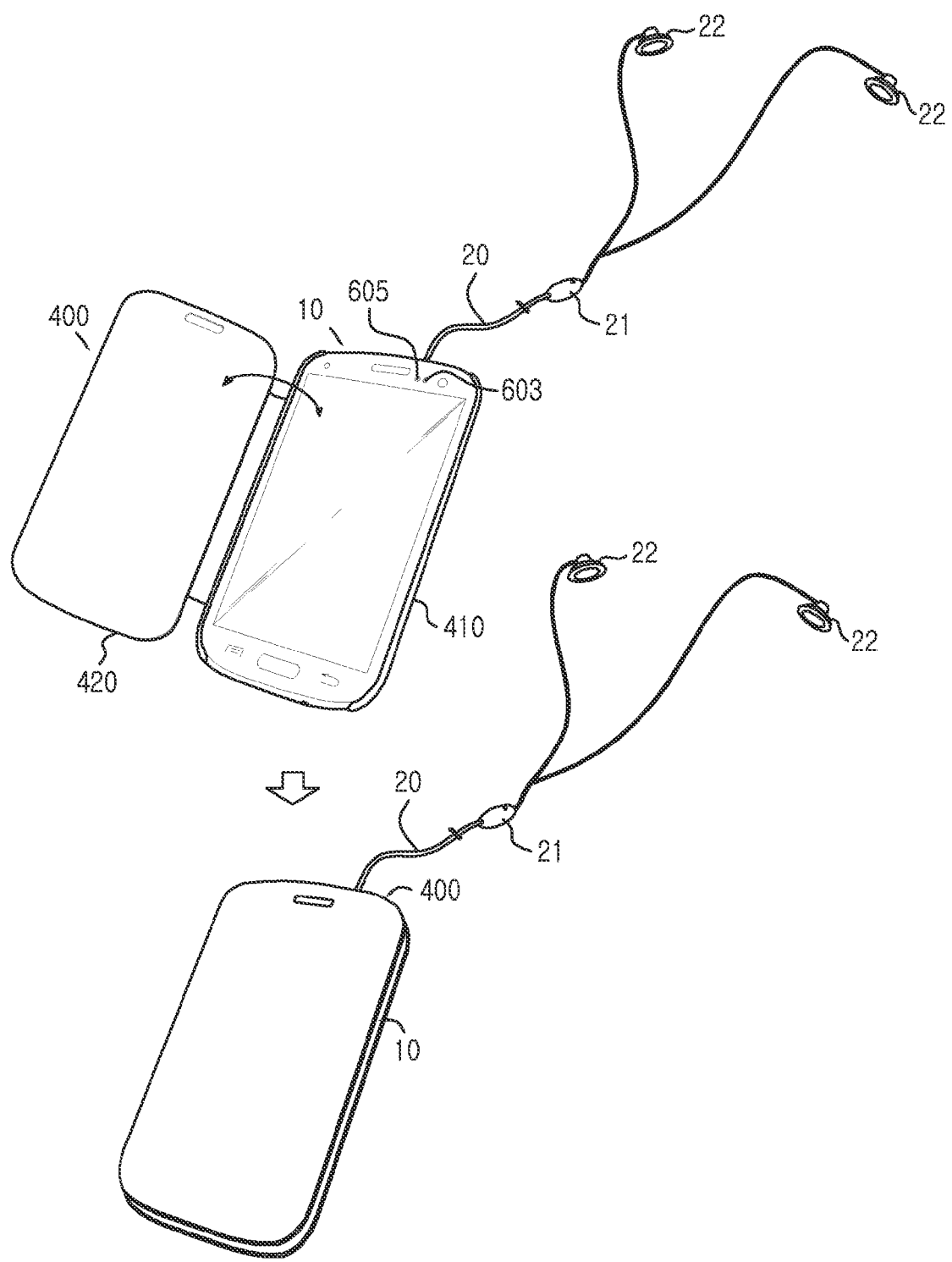
FIG. 4 illustrates a user device according to another embodiment of the present disclosure.

FIG. 4 illustrates a user device according to another embodiment of the present disclosure.

Referring to FIG. 4, a user device 10 may be coupled to a cover 400. The cover 400 may include a fixing part 410 and a folder part 420 connected to the fixing part 410. The fixing part 410 may fix the user device 10. The folder part 420 may rotate from the fixing part 410, and may close or open a front surface of the user device 10. When the folder part 420 covers the front surface of the user device 10, a proximity sensor 603 or a photo sensor 605 disposed on the front surface of the user device 10 may generate corresponding input. When an earset 20 including an external microphone 21 and an external speaker 22 is connected to the user device 10 and the front surface of the user device 10 is covered by the folder part 420, input may be generated from the proximity sensor 603 or the photo sensor 605. The user device 10 may activate voice recognition using the external microphone 21 of the earset 20 while executing an application (e.g., a music playback application) which may use voice recognition.

Figure 5:
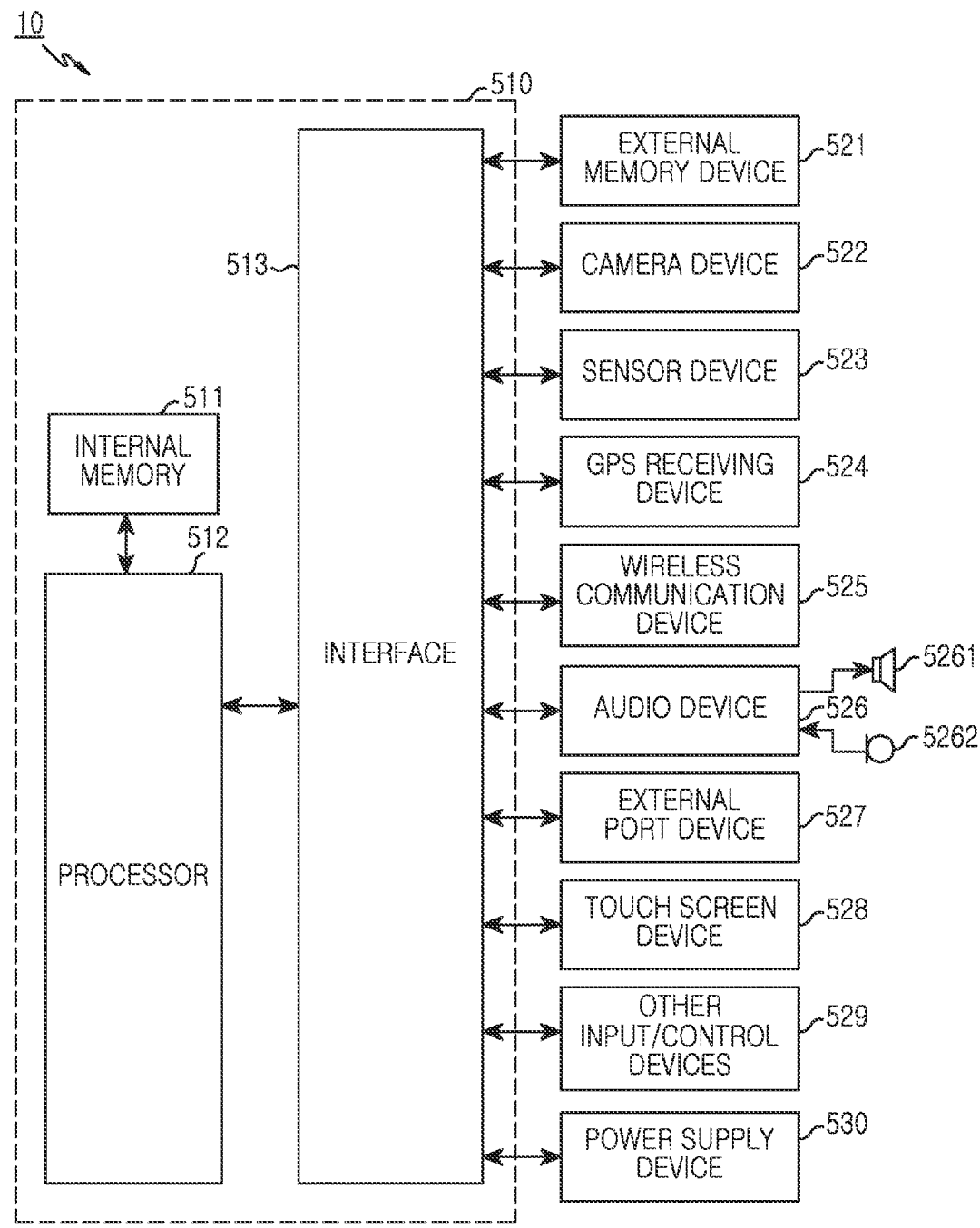
FIG. 5 is a block diagram illustrating configuration of a user device according to an embodiment of the present disclosure.

FIG. 5 is a block diagram illustrating configuration of a user device according to an embodiment of the present disclosure.

This user device denoted by 10 may be any one of apparatuses such as a mobile phone, a mobile pad, a media player, a tablet computer, a handheld computer, and a Personal Digital Assistant (PDA). Also, the user device 10 may be a certain electronic device including a device in which two or more functions are combined among these apparatuses.

The electronic device 10 may include a host device 510, an external memory device 521, a camera device 522, a sensor device 523, a Global Positioning System (GPS) receiving device 524, a wireless communication device 525, an audio device 526, an external port device 527, a touch screen device 528, other input/control devices 529, and a power supply device 530. Herein, the external memory device 521 and the external port device 527 may be a plurality of external memory devices and external port devices, respectively.

The host device 100 may include an internal memory 511, one or more processors 512, and an interface 513. The internal memory 511, the one or more processors 512, and the interface 513 may be separately configured or may be configured in one or more ICs.

The processor 512 executes several software programs and performs several functions for the user device 10. The processor 512 performs process and control for audio communication, video communication, and data communication. Also, in addition to these general functions, the processor 512 may execute a software module (instruction set) stored in the internal memory 511 and/or the external memory device 521 and perform several functions corresponding to the software module. Also, in addition to these general functions, the processor 512 may play a role in executing a specific software program (instruction set) stored in the internal memory 511 and/or the external memory device 521 and performing several specific functions corresponding to the specific software program. For example, the processor 512 may interwork with software programs stored in the internal memory 511 and/or the external memory device 521 and perform embodiments of the present disclosure. Also, the processor 512 may include one or more Application Processor Units (APUs), a Graphic Processor Unit (GPU), an audio processor unit, a communication processor unit, etc.

The APU may drive an Operating System (OS) applied to the user device 10, various functions, etc. The APU may be a device which collects all of many devices, such as a core, a memory, a display system/controller, a multimedia encoding/decoding codec, a 2 Dimension (D)/3D accelerator engine, an Image Signal Processor (ISP), a camera, an audio, a modem, and various high & low speed serial/parallel connectivity interfaces, on one chip. For example, the APU may drive an OS and applications and be a System-On-Chip (SOC) which collects devices for controlling several system devices/interfaces on one chip.

The GPU processes calculation associated with graphics. The GPU is responsible for image information process, acceleration, signal conversion, screen output, etc. This GPU may solve a bottleneck phenomenon generated by a graphic work of the APU and processes a 2D or 3D graphic more quickly than the APU.

The audio processor unit processes calculation associated with audio. The audio processor unit may change an audio signal of a digital or analog type through an audio effect or an audio effect unit.

The communication processor unit is responsible for processing communication with another device. When the user device 10 wants to use a communication function of a network, the communication processor unit may perform a function for setting network connection, etc.

The interface 513 may connect several devices of the electronic device 10 with the host device 510.

The external memory device 521 include a high-speed Random Access Memory (RAM) such as one or more magnetic storages, a non-volatile memory, one or more optical storages, and/or a flash memory (e.g., a NAND flash memory or a NOR flash memory). The external memory device 521 stores software components. The software components include an OS program, a communication program, a camera program, a graphics program, one or more application programs, a UI program, a codec program, etc. Herein, the term "programs" may be expressed in a set of instructions, an instruction set, or modules. The communication program, the camera program, the graphics program, the one or more application programs, the UI program, and the codec program may use various functions of the OS program through various Application Programming Interfaces (APIs).

The OS program means an embedded OS such as Windows, Linux, Darwin, RTXC, UNIX, OS X, or VxWorks. The OS program may include several software components for controlling a general system operation. Control of this general system operation includes memory management and control, storage hardware (device) control and management, power control and management, etc. Also, the OS program may perform a function for smoothly communicating between several hardware components (devices) and software components (programs).

The communication program may communicate with a computer, a server, another user device, etc. through the wireless communication device 525 or the external port device 527.

The camera program may include a camera-related software component for performing a camera-related process and camera-related functions. The camera program may perform a preprocessing procedure for applying various effects to an image from the camera device 522 and a postprocessing procedure for applying various effects to a captured snap image, under control of an API such as an Open Graphics Library (OpenGl) and a directX. Filtering for these effects may be managed at one time to be used in common in all of the preprocessing and postprocessing procedures, and may be also used in common in another program.

The graphics program may include several software components for providing and displaying graphics on the touch screen device 528. The graphics program may generate graphics based on the API such as the OpenGL and the direct and provide various filters for applying various effects to images. The term "graphics" means text, web pages, icons, digital images, video, animations, etc. This graphics program may be an image viewer, an image editing program, etc. which are used to postprocess images, and may be a camera related program, a video phone related program, etc. optimized to preprocess images. The graphics program may perform a postprocessing procedure for applying various effects to an image whose rendering is completed or a preprocessing procedure for applying various effects to images.

The application program includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, etc.

The UI program includes several software components related to a UI. Also, the UI program includes contents about whether a state of a UI is changed to any state, whether a state of a UI is changed in any condition, etc.

The codec program may include software components related to encoding and decoding of video files.

The external memory device 521 may further include additional programs (instructions) in addition to the above-described programs. Also, a variety of functions of the user device 10 may be executed by one or more streaming processors, hardware including an Application Specific Integrated Circuit (ASIC), software, and/or combination thereof.

The camera device 522 may perform a camera function such as a photo and video clip recording function. The camera device 522 mat include a Charge Coupled Device (CCD) or a Complementary Metal-Oxide Semiconductor (CMOS) device, etc. Also, the camera device 522 may adjust a change of a hardware-like configuration, for example, lens movement, an F number of a diaphragm, etc. according to the camera program executed by the processor 512.

A variety of components of the user device 10 may be coupled by one or more communication buses (not written in reference numbers) or stream lines (not written in reference numbers).

The sensor device 523 may include a grip sensor, a proximity sensor, a photo sensor, a touch sensor, a temperature sensor, an inertial sensor, etc. A detailed description will be given for the sensor device 523 shown in FIG. 6.

The GPS receiving device 524 may receive a signal transmitted from a GPS satellite and calculate a current position of the user device 10.

The wireless communication system 525 may perform wireless communication and include a Radio Frequency (RF) transceiver and an optical (e.g., infrared) transceiver. This wireless communication device 525 may include a module including at least one antenna, an RF connector, etc. The wireless communication device 525 may be designed to operate through one of communication networks, such as a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax Network, or/and a Bluetooth network.

The audio device 526 connects to a speaker 5261 and a microphone 5262 and is responsible for inputting and outputting audio, such as a voice recognition function, a voice copy function, a digital recording function, and a phone call function. The audio device 526 may include an audio amplifier. The audio device 526 communicates with a user through the speaker 5261 and the microphone 5262. Also, the audio device 526 receives a data signal from the host device 510, converts the received data signal into an electric signal, and outputs the converted electric signal through the speaker 5261. The speaker 5261 may convert a band of the electric signal into an audible frequency band and output the converted signal. The microphone 5262 may convert sound waves transmitted from people or other sound sources into electric signals. Also, the audio device 526 may receive the electric signal from the microphone 5262, convert the received electric signal into an audio data signal, and transmit the converted audio data signal to the host device 510.

The audio device 526 may include an earphone, a headphone, an earset, or a headset which may be attached and detached to the user device 10.

The external port device 527 may connect the user device 10 to another external electronic directly or connect it to another electronic device indirectly through a network (e.g., Internet, intranet, a wireless Local Area Network (LAN), etc.).

The touch screen device 528 may provide an input/output interface between the user device 10 and the user. The touch screen device 528 may transmit touch input of the user to the host device 510 and show visual information, for example, text, graphics, video, etc., provided from the host device 510 to the user by applying touch sensing technologies by the touch sensor of the sensor device 523. The touch screen device 528 may include a display for displaying images. This display may be one of an Electro Wetting Display (ESD), an E-paper, a Plasma Display Panel (PDP), a Liquid Crystal Display (LCD), an Organic Light Emitting Diode (OLED), and an Active Matrix Organic Light Emitting Diode (AMOLED). A touch sensor for the touch screen device 528 may be one of a digitizer for touch pen, a capacitive overlay touch panel, a resistance overlay touch panel, a surface acoustic wave touch panel, and an infrared beam touch panel.

The other input/control devices 529 may include an up/down button for controlling volume. In addition, the other input/control devices 529 may include at least one of pointer devices, such as a push button, a locker button, a locker switch, a thumb-wheel, a dial, a stick, and a stylus, each of them having a specific function.

The power supply device 530 may include a Power Management Integrated Circuit (PMIC). The PMIC may adjust battery power. For example, the processor 512 may transmit an interface signal according to a load to be processed to the power supply device 530 according to the load. The power supply device 530 may adjust a core voltage supplied to the processor 512 according to the interface signal. The processor 512 may always be driven by minimum power. There is at least one PMIC related with at least one of the external memory device 521, the camera sensor 522, the sensor device 523, the GPS receiving device 524, the wireless communication device 525, the audio device 526, the external port device 527, the touch screen device 528, and the other input/control devices 529 as well as a PMIC for the host device 510. Also, there is one integrated PMIC. The integrated PMIC may adjust battery power about at least one of the external memory device 521, the camera sensor 522, the sensor device 523, the GPS receiving device 524, the wireless communication device 525, the audio device 526, the external port device 527, the touch screen device 528, and the other input/control devices 529 as well as the host device 510.

Figure 6:
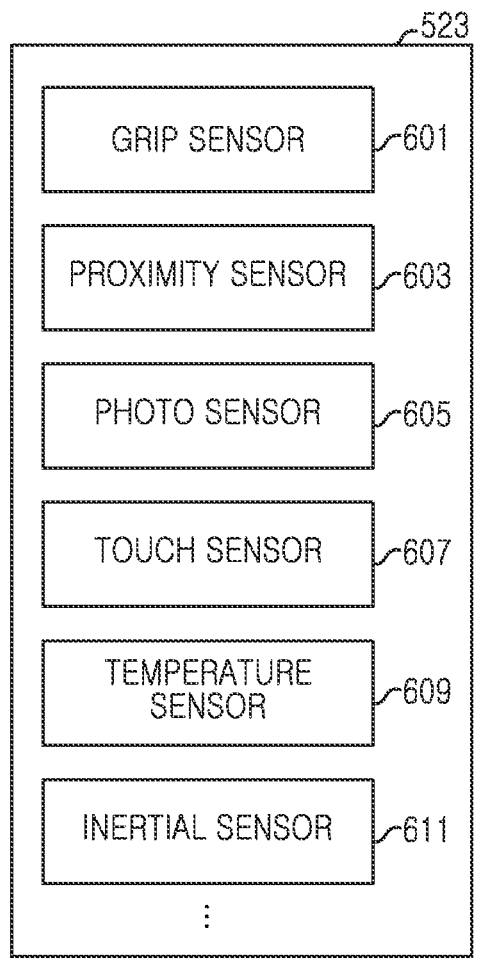
FIG. 6 is a block diagram illustrating detailed configuration of a sensor device according to an embodiment of the present disclosure.

FIG. 6 is a block diagram illustrating detailed configuration of a sensor device according to an embodiment of the present disclosure.

Referring to FIGS. 5 and 6, the sensor device 523 may include a grip sensor 601, a proximity sensor 603, a photo sensor 605, a touch sensor 607, a temperature sensor 609, an inertial sensor 611, etc.

The grip sensor 601 may sense micro-current. When a user grips the user device 10, the grip sensor 601 may sense micro-current which flow in a body of the user.

The proximity sensor 603 may sense that an object (e.g., a hand, a face, etc.) comes close to the user device 10 by a non-contact type. The proximity sensor 603 may be at least one of a module in which a hall element whose internal current is changed by magnetic influence and a permanent magnet are combined, a module in which a lamp or light emitting diode and a photo sensor are combined, a module for detecting a change of capacitance, etc.

The photo sensor 605 may detect light itself or information (e.g., illumination) included in light.

The touch sensor 607 may sense a touch and/or a proximity touch (hovering) on a screen by a finger, a touch pen, etc. of a user. The touch sensor 607 may be at least one of a digitizer, a capacitive overlay touch panel, a resistance overlay touch panel, a surface acoustic wave touch panel, an infrared beam touch panel, etc.

The temperature sensor 609 may detect a temperature about an object (e.g., a hand of the user) which comes in contact with the user device 10. When the user grips the user device 10, the temperature sensor 609 may detect a temperature of a hand of the user.

The inertial sensor 611 (e.g., a gyro sensor, an acceleration sensor, etc.) may detect information (e.g., acceleration, speed, direction, distance, etc.) about a motion of the user device 10.

The user device 10 may activate or inactivate voice recognition while executing an application which may use voice recognition, in response to whether there is input from at least one of the grip sensor 601, the proximity sensor 603, and the touch sensor 607. For example, when the user does not grip the user device 10, there is no input from the grip sensor 601. The user device 10 may convert inactivation into activation in voice recognition.

The user device 10 may activate or inactivate voice recognition while executing an application which may use voice recognition, in response to information from at least one of the photo sensor 605, the temperature sensor 609, and the inertial sensor 611. For example, when the user grips and lifts up the user device 10, the inertial sensor 611 may output specific information in response to the lifting up of the user device 10. The user device 10 may convert activation into inactivation in voice recognition while executing an application which may use voice recognition in response to the specific information.

Figure 7:
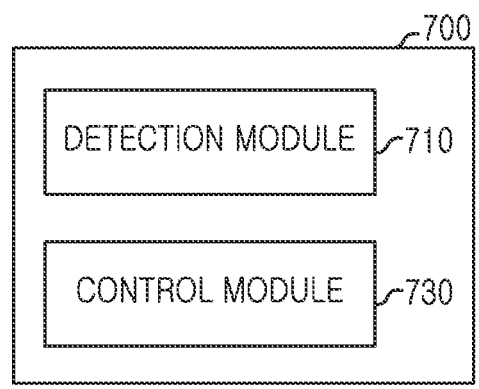
FIG. 7 is a block diagram illustrating configuration of a voice recognition module according to an embodiment of the present disclosure.

FIG. 7 is a block diagram illustrating configuration of a voice recognition module according to an embodiment of the present disclosure.

Referring to FIGS. 5 to 7, a voice recognition module 700 may include a detection module 710 and a control module 730.

The detection module 710 may detect whether there is input from at least one sensor (e.g., the grip sensor 601, the proximity sensor 603, and the touch sensor 607) in response to execution of an application which may use voice recognition. The application which may use voice recognition may be at least one of a photographing application, a music playback application, an e-book application, a portal search application, etc. For example, when a user grips the user device 10, input may be generated from the grip sensor 601. The detection module 410 may sense the generated input. When the user touches a screen of the user device 10, input may be generated from the touch sensor 607. The detection module 710 may sense the generated input.

The control module 730 may activate or inactivate voice recognition in response to whether there is input from at least one sensor. When the voice recognition may be activated, the control module 730 may use a microphone which is previously specified in an application. When an earset or headset is connected to the user device 10, the control module 730 may use a microphone installed in the earset or headset in voice recognition instead of a microphone of the user device 10.

Figure 8:
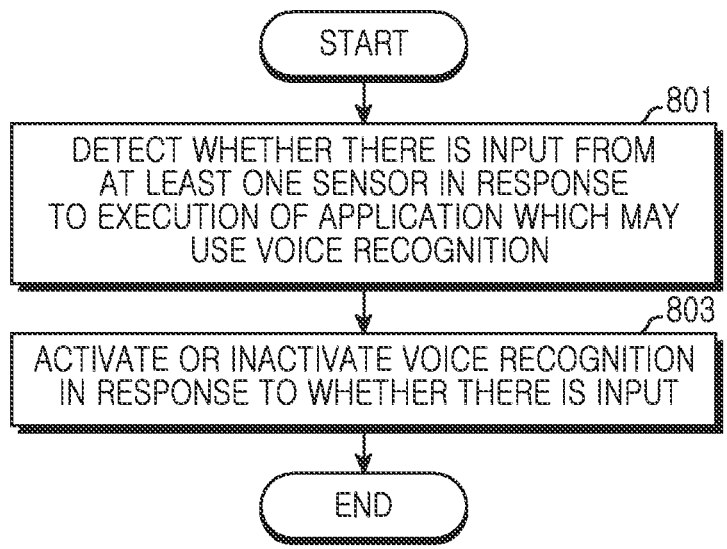
FIG. 8 is a flowchart illustrating a voice recognition procedure according to an embodiment of the present disclosure.

FIG. 8 is a flowchart illustrating a voice recognition procedure according to an embodiment of the present disclosure.

Referring to FIGS. 5, 7, and 8, in operation 801, the processor 512 (e.g., the detection module 710) may detect whether there is input from at least one sensor in response to execution of an application which may use voice recognition. In operation 803, the processor 512 (e.g., the control module 730) may activate or inactivate voice recognition in response to the detected input.

Figure 9:
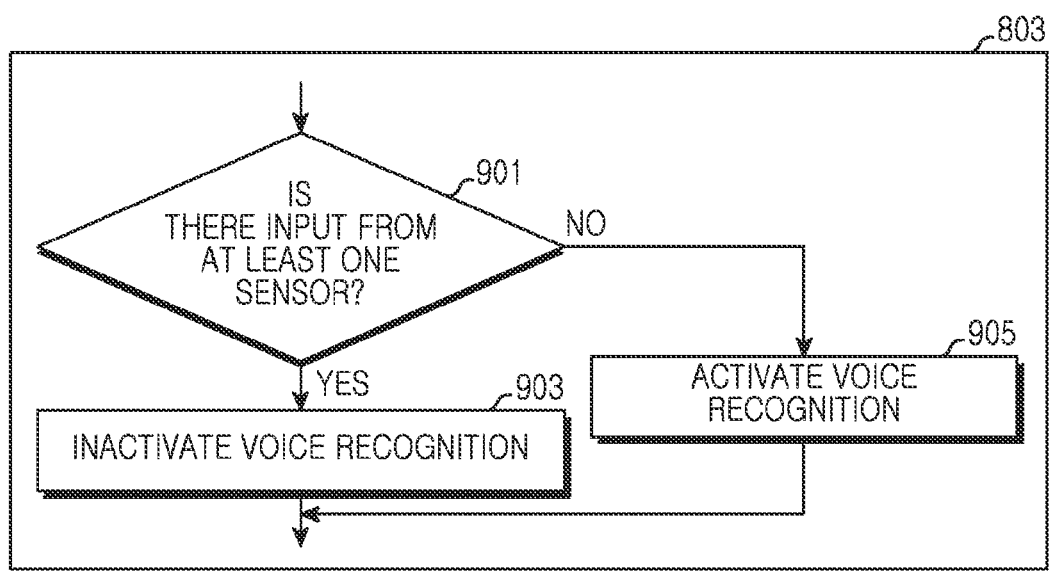
FIGS. 9 to 12 are flowcharts illustrating operation 803 of FIG. 8 according to various embodiments of the present disclosure.

FIG. 9 is a flowchart illustrating operation 803 of FIG. 8 according to an embodiment of the present disclosure.

Referring to FIGS. 5 and 9, in operation 901, the processor 512 may verify whether there is input from at least one sensor. When there is the input from at least one sensor ('YES'), in operation 903, the processor 512 may inactivate voice recognition. When there is no input from at least one sensor ('NO'), in operation 905, the processor 512 may activate the voice recognition.

Figure 10:
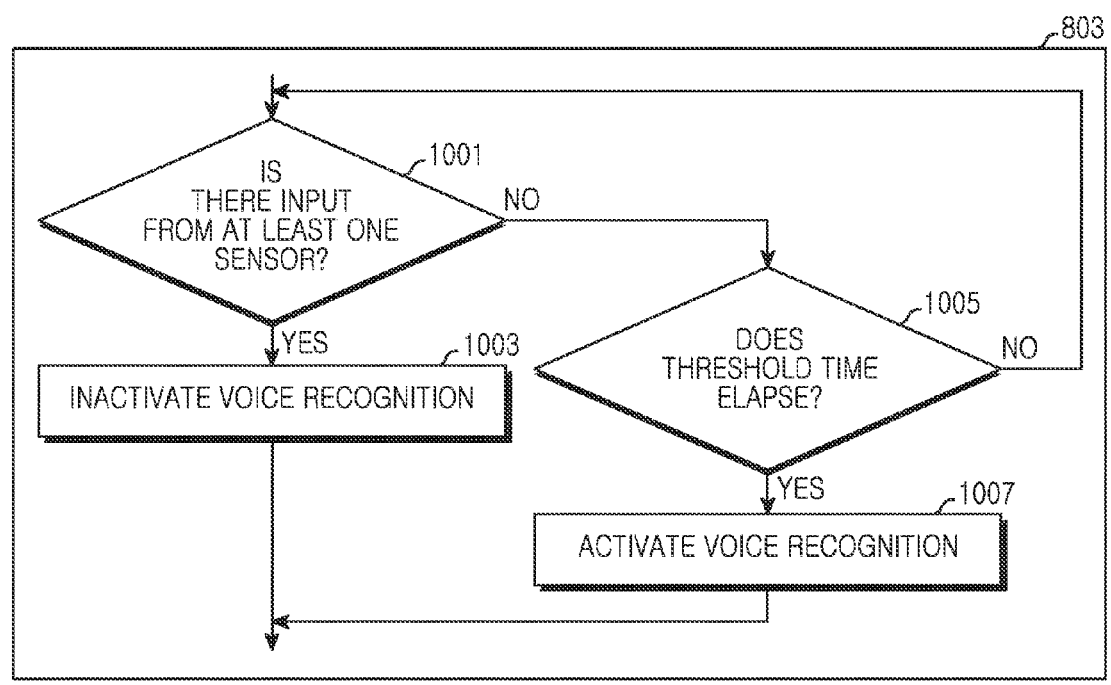

FIG. 10 is a flowchart illustrating operation 803 of FIG. 8 according to another embodiment of the present disclosure.

Referring to FIGS. 5 and 10, in operation 1001, the processor 512 may verify whether there is input from at least one sensor. When there is the input from at least one sensor ('YES'), in operation 1003, the processor 512 may inactivate voice recognition. When there is no input from at least one sensor ('NO'), in operation 1005, the processor 512 may verify whether a threshold time elapses. When the threshold time elapses ('YES'), in operation 1007, the processor 512 may activate the voice recognition. When the threshold time does not elapse ('NO'), the processor 512 may perform the processing from operation 1001 again.

Figure 11:
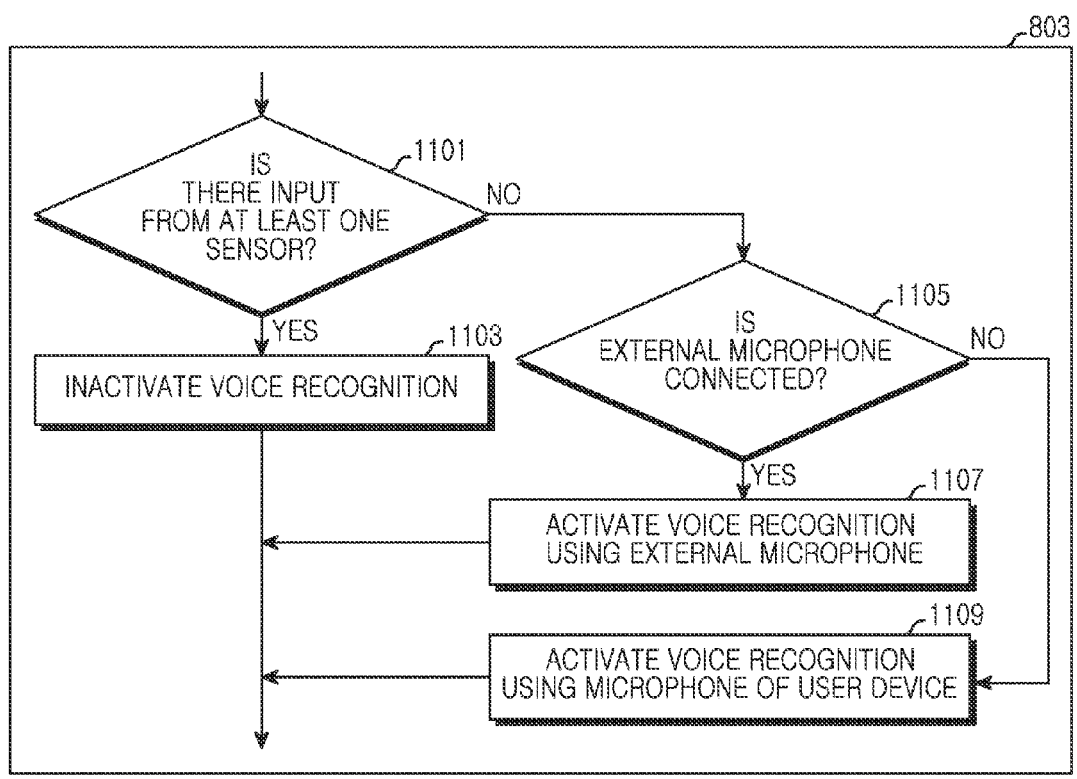

FIG. 11 is a flowchart illustrating operation 803 of FIG. 8 according to another embodiment of the present disclosure.

Referring to FIGS. 5 and 11, in operation 1101, the processor 512 may verify whether there is input from at least one sensor. When there is the input from at least one sensor ('YES'), in operation 1103, the processor 512 may inactivate voice recognition. When there is no input from at least one sensor ('NO'), in operation 1105, the processor 512 may verify whether an external microphone is connected with the user device 10. When the external microphone is connected with the user device 10 ('YES'), in operation 1107, the processor 512 may activate the voice recognition using the external microphone. When the external microphone is not connected with the user device 10 ('NO'), operation 1109, the processor 512 may activate the voice recognition using a microphone of the user device 10.

Figure 12:
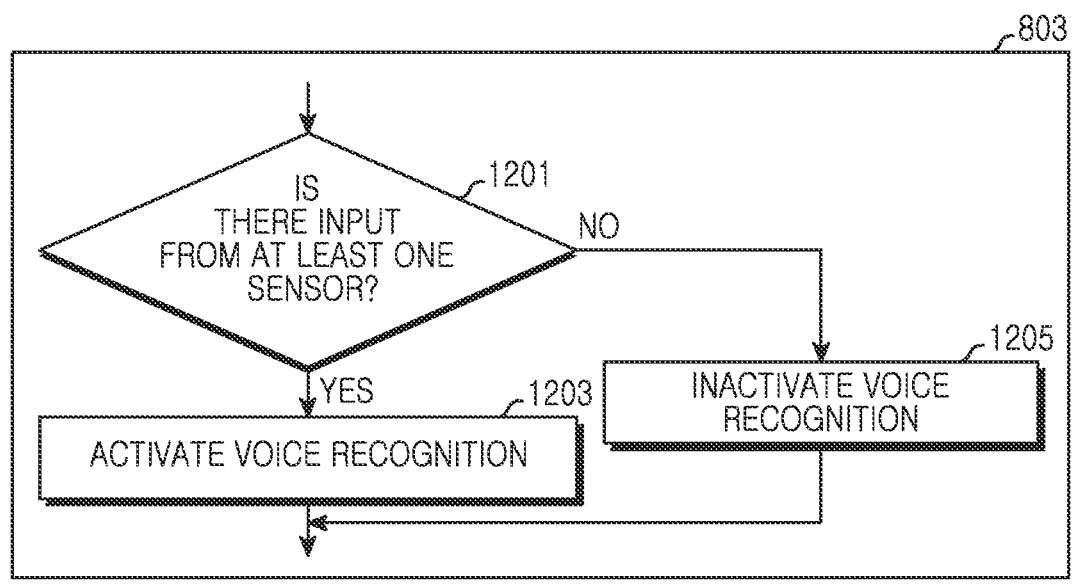

FIG. 12 is a flowchart illustrating operation 803 of FIG. 8 according to another embodiment of the present disclosure.

Referring to FIGS. 5 and 12, in operation 1201, the processor 512 may verify whether there is input from at least one sensor. When there is the input from at least one sensor ('YES'), in operation 1203, the processor 512 may activate voice recognition. When there is no input from at least one sensor ('NO'), in operation 1205, the processor 512 may inactivate the voice recognition.

Figure 13:
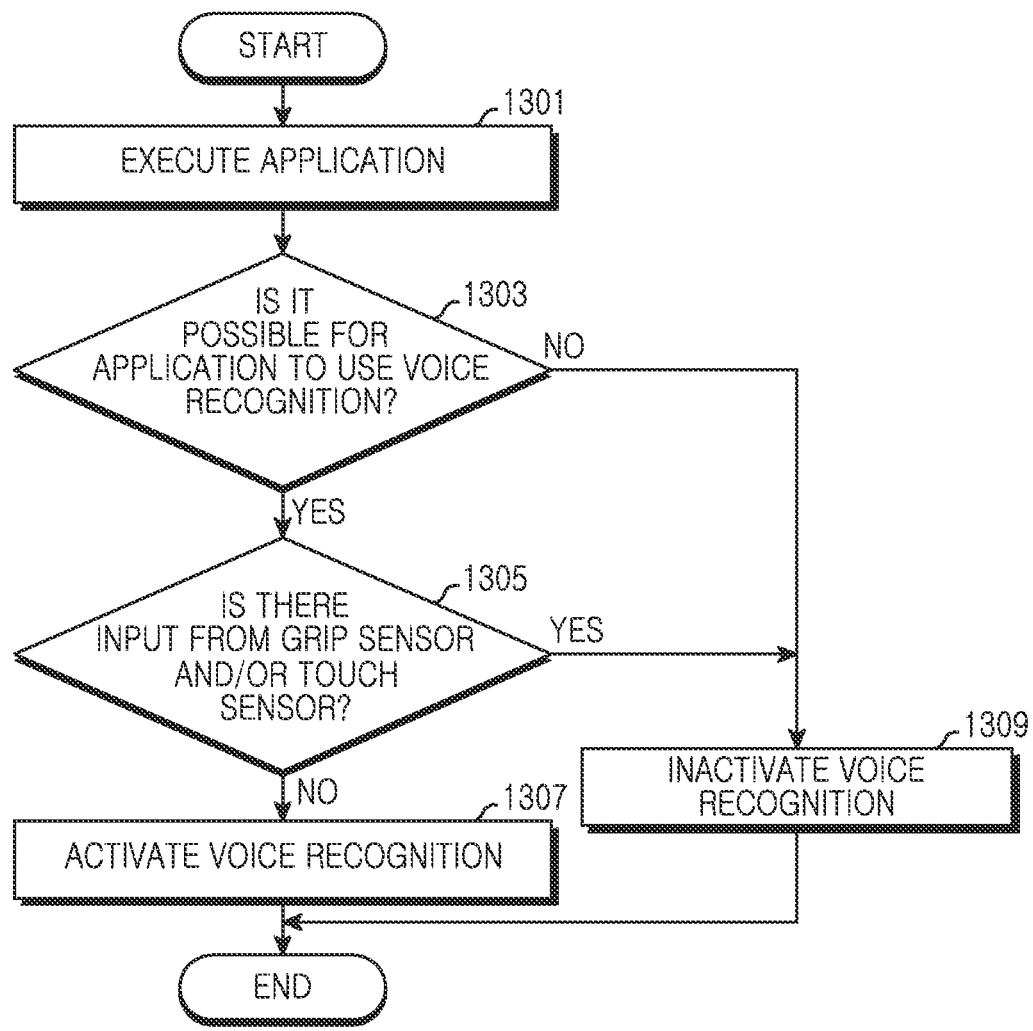
FIGS. 13 and 14 are flowcharts illustrating a voice recognition execution procedure according to another embodiment of the present disclosure.

FIG. 13 is a flowchart illustrating a voice recognition procedure according to another embodiment of the present disclosure.

Referring to FIGS. 5, 7, and 13, in operation 1301, the processor 512 may execute an application. In operation 1303, the processor 512 may verify whether the application may use voice recognition. When the application may not use the voice recognition ('NO'), in operation 1309, the processor 512 may inactivate the voice recognition. When the application may use the voice recognition ('YES'), in operation 1305, the processor 512 (e.g., the detection module 710) may detect whether there is input from a grip sensor and/or a touch sensor. When there is the input from the grip sensor and/or the touch sensor ('YES'), in operation 1309, the processor 512 may inactivate the voice recognition. When there is no input from the grip sensor and/or the touch sensor ('NO'), in operation 1307, the processor 512 may activate the voice recognition.

Figure 14:
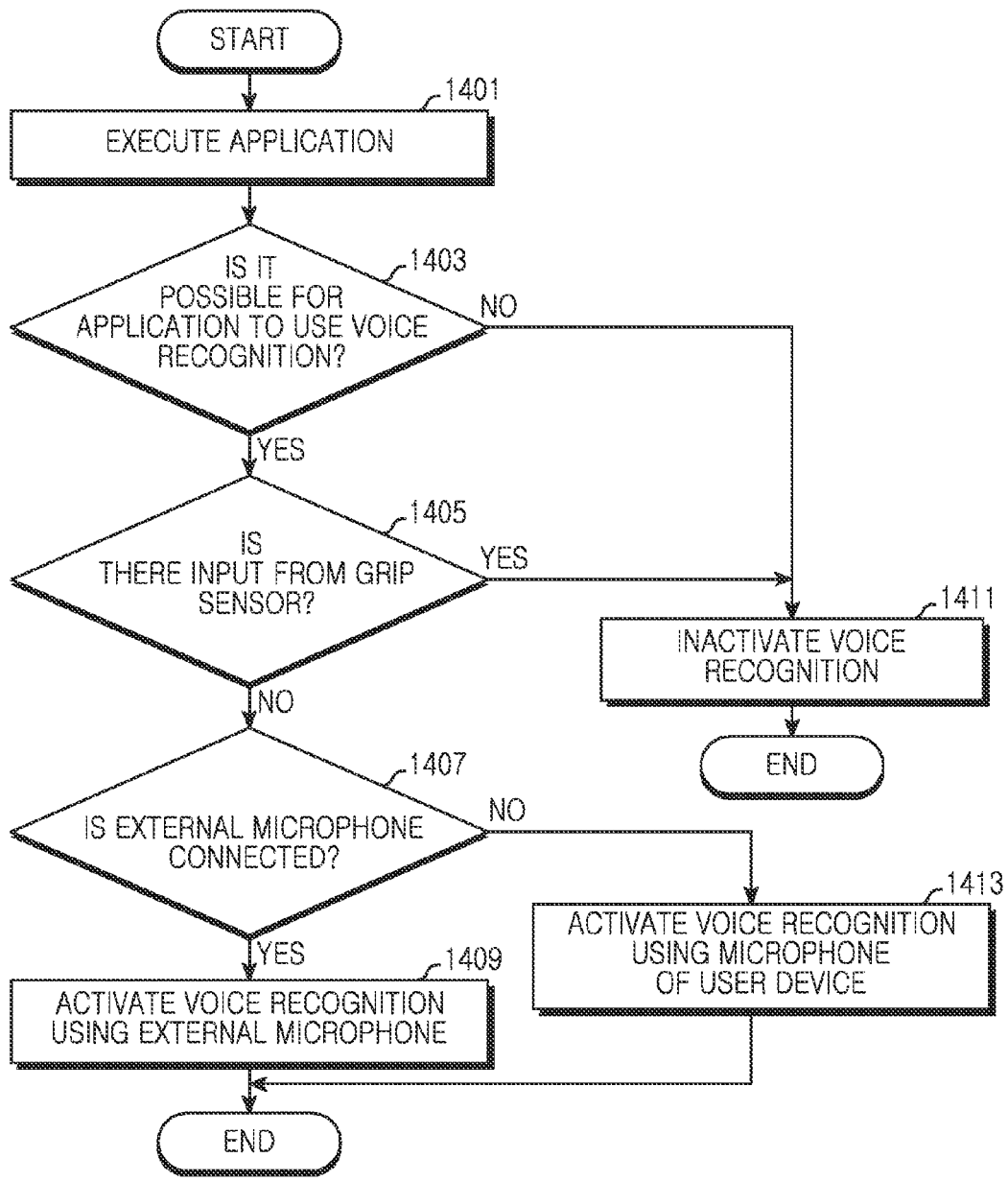

FIG. 14 is a flowchart illustrating a voice recognition procedure according to another embodiment of the present disclosure.

Referring to FIGS. 5, 7, and 14, in operation 1401, the processor 512 may execute an application. In operation 1403, the processor 512 may verify whether the application may use voice recognition. When the application may not use the voice recognition ('NO'), in operation 1411, the processor 512 may inactivate the voice recognition. When the application may use the voice recognition ('YES'), in operation 1405, the processor 512 (e.g., the detection module 710) may detect whether there is input from a grip sensor. When there is the input from the grip sensor ('YES'), in operation 1411, the processor 512 may inactivate the voice recognition. When there is no input from the grip sensor ('NO'), in operation 1407, the processor 512 may verify whether an external microphone is connected with the user device 10. When the external microphone is connected with the user device 10 ('YES'), in operation 1409, the processor 512 may activate the voice recognition using the external microphone. When the external microphone is not connected with the user device 10 ('NO'), in operation 1413, the processor 512 may activate the voice recognition using a microphone of the user device 10.

Figure 15:
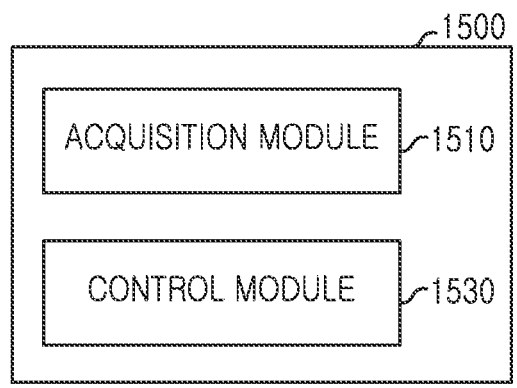
FIG. 15 is a block diagram illustrating configuration of a voice recognition module according to another embodiment of the present disclosure.

FIG. 15 is a block diagram illustrating configuration of a voice recognition module according to another embodiment of the present disclosure.

Referring to FIGS. 5, 6, and 15, a voice recognition module 1500 may include an acquisition module 1510 and a control module 1530.

The acquisition module 1510 may acquire information from at least one sensor (e.g., the photo sensor 605, the temperature sensor 609, and the inertial sensor 611) in response to execution of an application which may use voice recognition. The application which may use the voice recognition may be at least one of a photographing application, a music playback application, an e-book application, a portal search application, etc. When a user grips and lifts up the user device 10, the inertial sensor 611 may output specific information in response to the lifting up of the user device 10 and the acquisition module 1510 may acquire information from the inertial sensor 611.

The control module 1530 may activate or inactivate the voice recognition in response to the acquired information. For example, the control module 1530 may determine a grip of the user device 10 from the information acquired from the inertial sensor 611 and covert activation into inactivation in the voice recognition while executing the application which may use the voice recognition.

Figure 16:
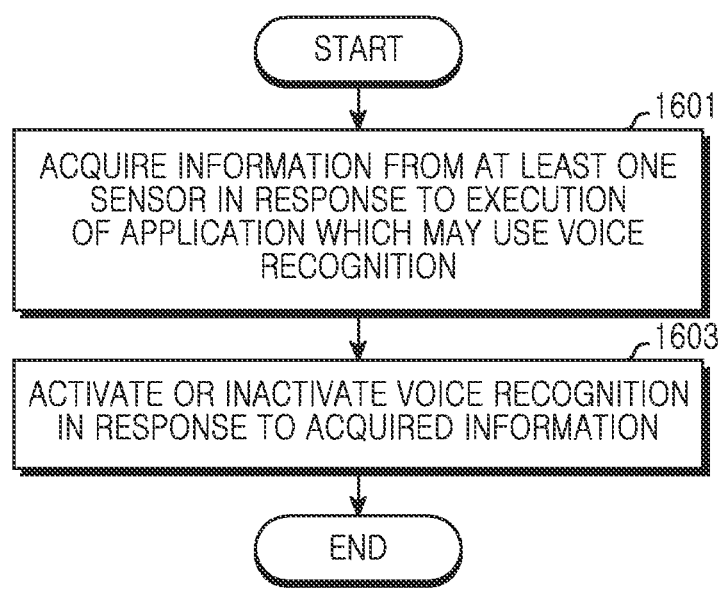
FIG. 16 is a flowchart illustrating a voice recognition procedure according to another embodiment of the present disclosure.

FIG. 16 is a flowchart illustrating a voice recognition procedure according to another embodiment of the present disclosure.

Referring to FIGS. 5, 15, and 16, in operation 1601, the processor 512 (e.g., the acquisition module 1510) may acquire information from at least one sensor in response to execution of an application which may use voice recognition. In operation 1603, the processor 512 (e.g., the control module 1530) may activate or inactivate the voice recognition in response to the acquired information.

Figure 17:
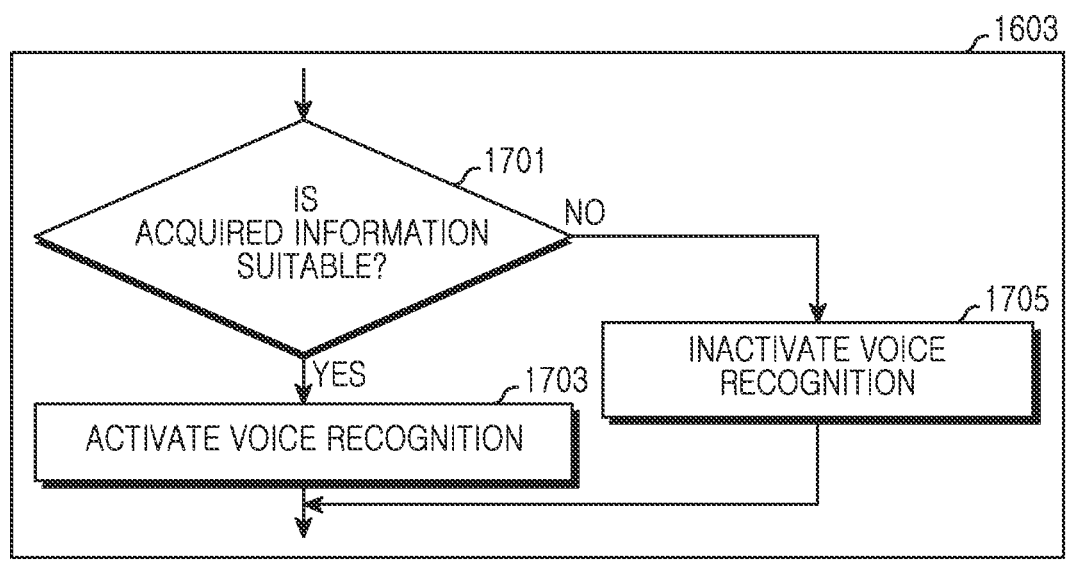
FIG. 17 is a flowchart illustrating operation 1603 of FIG. 16 according to another embodiment of the present disclosure.

FIG. 17 is a flowchart illustrating operation 1603 of FIG. 16 according to another embodiment of the present disclosure.

Referring to FIGS. 5, 6, and 17, in operation 1701, the processor 512 may determine whether acquired information is suitable. When the acquired information is suitable ('YES'), in operation 1703, the processor 512 may activate voice recognition. When the acquired information is not suitable ('NO'), in operation 1705, the processor 512 may inactivate the voice recognition. For example, when illumination acquired from the photo sensor 605 is less than or equal to a reference value (e.g., when a user puts the user device 10 in his or her pocket), the processor 512 may activate the voice recognition. When the illumination is not less than or equal to the reference value, the processor 512 may inactivate the voice recognition. When the information acquired from the inertial sensor 611 corresponds to a predetermined motion of the user device 10, the processor 512 may activate the voice recognition. When the information acquired from the inertial sensor 611 does not correspond to the predetermined motion of the user device 10, the processor 512 may inactivate the voice recognition.

Figure 18:
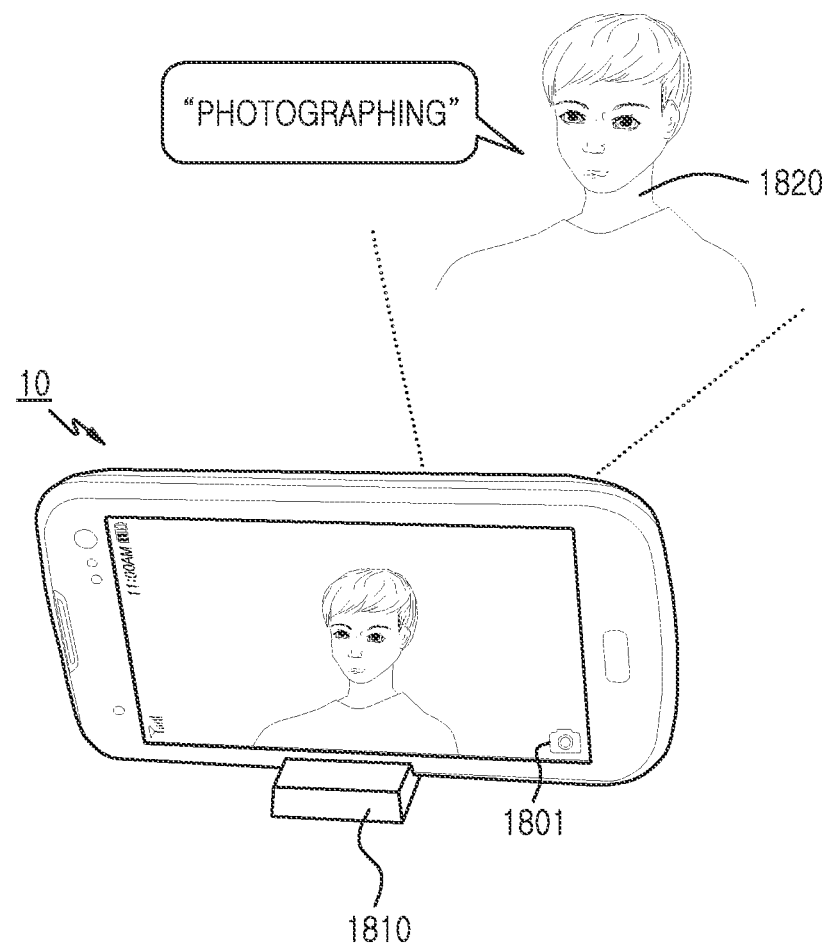
FIG. 18 illustrates a process of photographing an object according to an embodiment of the present disclosure.

FIG. 18 illustrates a process of photographing an object according to an embodiment of the present disclosure.

Referring to FIGS. 5, 6, and 18, a user 1820 may put the user device 10 which may execute a photographing application on a stand 1810 and move a position of the stand 1810 to another place. When the user 1820 grips the user device 10, the grip sensor 601 of the user device 10 may generate input. On the other hand, as shown in FIG. 18, when the user 1820 does not grip the user device 10, the grip sensor 601 of the user device 10 may not generate input. When there is no input from the grip sensor 601, the user device 10 may convert inactivation into activation automatically in voice recognition. When the user 1820 says "photographing" without pushing a photographing button 1801 displayed on a screen of the user device 10, the user device 10 may receive a command for executing the photographing through voice recognition and execute the photographing.

Figure 19:
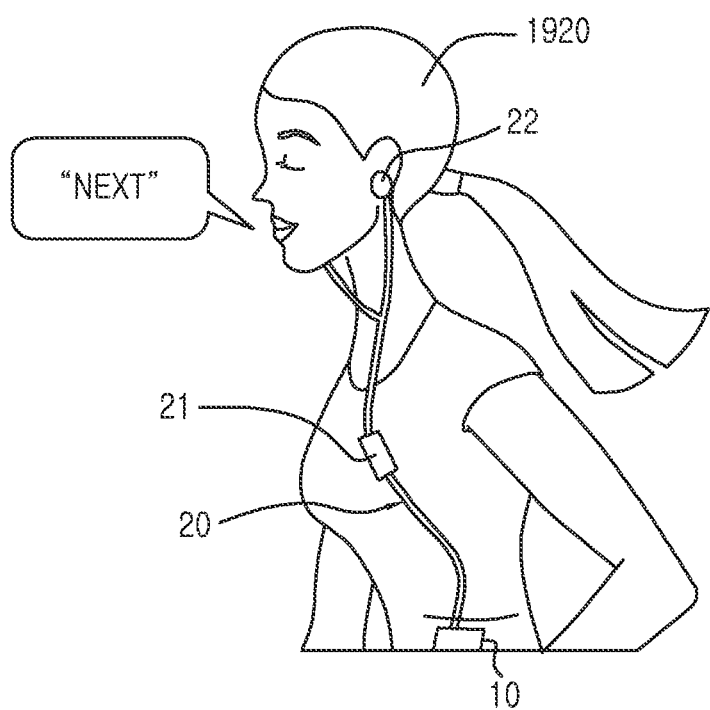
FIG. 19 illustrates a process of reproducing music according to an embodiment of the present disclosure.

FIG. 19 illustrates a process of reproducing music according to an embodiment of the present disclosure.

Referring to FIGS. 5, 6, and 19, a user 1920 may connect an earset 20 to the user device 10 which executes a music playback application and put an earphone 22 of the earset 20 in his ears. An audio signal from the user device 10 may be output as a sound through the earphone 22 of the earset 20. The user 1920 may put the user device 10 in his or her pocket without gripping the user device 10. When the user 1920 may grip the user device 10, the grip sensor 601 of the user device 10 may generate input. On the other hand, as shown in FIG. 19, when the user 1920 does not grip the user device 10, the grips sensor 601 of the user device 10 may not generate input. When there is no input from the grip sensor 601, the user device 10 may activate voice recognition using a microphone of the earset 20. For example, when the user 1920 says "next" without pulling and operating the user device 10 from his or her pocket, the user device 10 may receive a command for reproducing a next music through voice recognition using the microphone 21 of the earset 20 and reproduce the next music.

Various embodiments of the present disclosure may be applied to an e-book application. When the user grips the user device 10, the grip sensor 601 of the user device 10 may generate input. On the other hand, when the user does not grip the user device 10, the grip sensor 601 of the user device 10 may not generate input. When there is input from the grip sensor 601, the user device 10 may inactivate voice recognition. The user may push a button and change a current page to a next or previous page. When there is no input from the grip sensor 601, the user device 10 may activate voice recognition. The user may change the current page to a next or previous page through a voice command.

According to various embodiments of the present disclosure, respective modules may be configured by software, firmware, hardware, or combination of them. Also, some or all of the modules may be configured in one entity. Functions of the respective modules may be equally performed. According to various embodiments of the present disclosure, respective processes may be executed successively, repeatedly, or in parallel. Also, some processes may be omitted, or other processes may be added and executed. For example, respective processes may be executed by corresponding modules described in embodiments of the present disclosure.

In case of a conventional user device, a user of the conventional user device must select activation or inactivation of voice recognition directly through a menu while executing an application which may use voice recognition. This results in an inconvenience to the user. On the other hand, according to various embodiments of the present disclosure, when an application which may use voice recognition is executed, the user device 10 may determine conditions in which voice recognition is suitable and conditions in which voice recognition is not suitable through the sensor device 523. Because the user device 10 may inactivate or activate voice recognition automatically as a result of the determination, it may enhance convenience of the user.

Therefore, the user device according to embodiments of the present disclosure may activate or inactivate voice recognition automatically in response to whether there is input from at least one sensor while executing an application which may use the voice recognition. Also, the user device according to embodiments of the present disclosure may activate or inactivate voice recognition automatically in response to information from at least one sensor which executes an application which may use the voice recognition. Because the user does not select activation or inactivation of voice recognition directly through a menu, availability about voice recognition may be improved.

Methods according to claims of the present disclosure and/or embodiments described in the specification of the present disclosure may be implemented as hardware, software, or combinational type of the hardware and the software.

When the method is implemented by the software, a computer-readable storage medium for storing one or more programs (software modules) may be provided. The one or more programs stored in the computer-readable storage medium may be executed by one or more processors in an electronic device. The one or more programs include instructions for allowing an electronic device to execute the methods according to the claims of the present disclosure and/or the embodiments described in the specification of the present disclosure.

These programs (software module, software) may be stored in a Random Access Memory (RAM), a non-volatile memory including a flash memory, a Read Only Memory (ROM), an Electrically Erasable Programmable ROM (EEPROM), a magnetic disc storage device, a Compact Disc-ROM (CD-ROM), a Digital Versatile Disc (DVD) or an optical storage device of a different type, and a magnetic cassette. Or, the programs may be stored in a memory configured by combination of some or all of them. Also, the configured memory may include a plurality of memories.

Also, the programs may be stored in an attachable storage device which may access an electronic device through each of communication networks such as the Internet, an intranet, a Local Area Network (LAN), a Wide LAN (WLAN), and a Storage Area Network (SAN) or a communication network configured by combination of them. This storage device may connect to the electronic device through an external port.

Also, a separate storage device on a communication network may connect to a portable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device comprising:
   detecting an execution of an application; and
   in response to a determination that the application is operable to perform at least one function based on a voice command, activating or inactivating a voice recognition function using a microphone of the electronic device based on whether a touch input or hovering input is detected by a touch sensor in a screen of the electronic device,
   wherein, when the touch input or hovering input is detected, the voice recognition function using the microphone is inactivated while executing the application,
   wherein the voice recognition function using the microphone is inactivated within a threshold time elapsed after the touch input or hovering input is detected while executing the application, and
   wherein the voice recognition function using the microphone is activated once the threshold time has elapsed without another touch input or hovering input after the touch input or hovering is detected.

2. The method of claim 1, further comprising:
   identifying of whether the electronic device is in the proximity of the user depends on an input generated from a grip sensor or a proximity sensor, and
   activating the voice recognition function using the microphone while executing the application when the input from the grip sensor or the proximity sensor is detected,
   wherein the grip sensor is configured to detect a microcurrent in association with the input, and
   wherein the proximity sensor is configured to detect a change of capacitance in association with the input.

3. The method of claim 1, further comprising:
   determining whether an external microphone is electronically connected to the electronic device;
   in response to the determination that the external microphone is electronically connected to the electronic device, activating the voice recognition function using the external microphone; and
   in response to the determination that the external microphone is not electronically connected to the electronic device, activating the voice recognition function using a microphone of the electronic device.

4. The method of claim 1, wherein the application, which is operable to perform the at least one function based on the voice command, includes a camera application.

5. The method of claim 4, wherein the at least one function of the camera application includes a photographing function.

6. The method of claim 5, further comprising:
displaying a photographing button on the screen according to the executed application,
wherein the photographing button is used for the photographing function.

7. The method of claim 1, wherein the application, which is operable to perform the at least one function based on the voice command, includes at least one of a music playback application or an e-book application.

8. An electronic device comprising:
a screen with a touch sensor; and
a processor configured to:
detect an execution of an application, and
in response to a determination that the application is operable to perform the at least one function based on a voice command, activate or inactivate a voice recognition function using a microphone of the electronic device based on whether a touch input or hovering input is detected by the touch sensor in the screen,
wherein, when the touch input or hovering input is detected, the voice recognition function using the microphone is inactivated while executing the application,
wherein the voice recognition function using the microphone is inactivated within a threshold time elapsed after the touch input or hovering input is detected while executing the application, and
wherein the voice recognition function using the microphone is activated once the threshold time has elapsed without another touch input or hovering input after the touch input or hovering input is detected.

9. The electronic device of claim 8, further comprising a grip sensor or a proximity sensor,
wherein the processor is further configured to:
identify of whether the electronic device is in the proximity of the user depends on an input generated from the grip sensor or the proximity sensor, and
activate the voice recognition function using the microphone while executing the application when the input from the grip sensor or the proximity sensor is detected,
wherein the grip sensor is configured to detect a microcurrent in association with the input, and
wherein the proximity sensor is configured to detect a change of capacitance in association with the input.

10. The electronic device of claim 8, wherein the processor is further configured to:
determine whether an external microphone is electronically connected to the electronic device,
in response to the determination that the external microphone is electronically connected to the electronic device, activate the voice recognition function using the external microphone, and
in response to the determination that the external microphone is not electronically connected to the electronic device, activate the voice recognition function using a microphone of the electronic device.

11. The electronic device of claim 8, wherein the application, which is operable to perform the at least one function based on the voice command, includes a camera application.

12. The electronic device of claim 11, wherein the at least one function of the camera application includes a photographing function.

13. The electronic device of claim 12,
wherein the processor is further configured to display a photographing button on the screen according to the executed application, and
wherein the photographing button is used for the photographing function.

14. The electronic device of claim 8, wherein the application, which is operable to perform the at least one function based on the voice command, includes at least one of a music playback application or an e-book application.

* * * * *